United States Patent
Hokanson

(10) Patent No.: US 6,188,153 B1
(45) Date of Patent: Feb. 13, 2001

(54) SEGMENTED STATOR END TURN AIR DEFLECTOR FOR FORCE VENTILATED AC MOTOR

(75) Inventor: Paul Robert Hokanson, Girard, PA (US)

(73) Assignee: General Electric Company, Schnectady, NY (US)

(*) Notice: Under 35 U.S.C. 154(b), the term of this patent shall be extended for 0 days.

(21) Appl. No.: 09/252,942

(22) Filed: Feb. 18, 1999

(51) Int. Cl.$^7$ .................................................. H02K 9/00
(52) U.S. Cl. ................. 310/52; 310/58; 310/59; 310/60 A; 310/60 R; 310/64; 310/65
(58) Field of Search .............. 310/58, 602, 604, 310/64, 68; 36/52–58

(56) References Cited

U.S. PATENT DOCUMENTS

| | | | |
|---|---|---|---|
| 3,819,965 | * | 6/1974 | Schoendube .................. 310/58 |
| 4,072,872 | * | 2/1978 | Gleichman .................... 310/53 |
| 4,442,371 | * | 4/1984 | Utsunomiya et al. ......... 310/260 |
| 4,609,840 | * | 9/1986 | Eats et al. ...................... 310/58 |
| 4,766,337 | * | 8/1988 | Parkinson et al. .............. 310/58 |
| 5,081,384 | * | 1/1992 | Rausch ........................... 310/63 |
| 5,177,385 | * | 1/1993 | Cooper et al. .................. 310/53 |
| 5,214,324 | | 5/1993 | Holmes . |
| 5,306,972 | | 4/1994 | Hokanson . |
| 5,343,101 | * | 8/1994 | Matani ........................... 310/58 |
| 5,757,094 | * | 5/1998 | Van Duyn ....................... 310/58 |

* cited by examiner

*Primary Examiner*—Elvin Enad
(74) *Attorney, Agent, or Firm*—Carl A. Rowold; Jill M. Breedlove

(57) ABSTRACT

A segmented stator end turn air deflector for an electric motor having a stator and a rotor. The stator has a plurality of stator coils with end turns and a plurality of air passages extending longitudinally through the stator. A frame having an inlet end and an outlet end surrounds the stator. The rotor is rotatably mounted inside the stator and the frame. Brackets are coupled adjacent to the outlet end of the frame in a circular orientation. An air baffle assembly is coupled with respect to the stator adjacent to the outlet end and extending between, but out of contact with, the frame and ends of the coils for the purpose of directing any air flowing from the air passages onto the end turns. The air baffle assembly includes a plurality of arcuate segments each coupled to a respective one of the brackets. The air baffle assembly further has a radially interior arcuate end and a radially exterior arcuate end and angularly oriented side edges which converge inwardly.

8 Claims, 2 Drawing Sheets

SEGMENTED STATOR END TURN AIR DEFLECTOR FOR FORCE VENTILATED AC MOTOR

BACKGROUND OF THE INVENTION

The present invention relates to a segmented stator end turn air deflector for a force ventilated AC motor and, more particularly, to a method and apparatus for directing the air flow of dynamo electric machines such as an AC electric motor or an alternator through the stator end turns for more efficient cooling.

Typical dynamo electric machines such as AC electric motors or alternators are formed of a rotatable rotor and a fixed stator. Stators are normally formed of a series of thin, flat plates stacked to form a solid body. Coils or windings are positioned in pre-formed slots in the plates, extending through the stack, with ends of the coils looping at each end of the stack to form end turns. The stator is normally cooled by air blowing through passages in the stator. Some air flows through the gap between the stator and the rotor. All of the air exits the machine through openings in an end of the housing (the "end bell") supporting the stator. As the air exits in a longitudinal direction, very little of the air actually passes through the coil end turns.

In general, prior art methods and apparatuses for increasing the efficiency of force ventilated AC motors by more efficient cooling have been directed to methods suitable only for initial manufacturing. For example, U.S. Pat. No. 5,214,324 to Holmes describes a stator air baffle provided to redirect cooling air flow exiting the stator of an electric motor. The air baffle is provided at the air outlet end of the motor and extends between the stator frame and the stator coils so that air is redirected to pass through the coil end turns before exiting the motor. The baffle is fixed to the coils but is loosely mounted to the stator frame in a floating manner so that the entire assembly is free to rotate and can have limited longitudinal motion when necessary according to the operating condition of the motor.

U.S. Pat. No. 5,306,972 to Hokanson et al. describes an AC motor system having a rotor and a stator with the rotor having a plurality of air passages for passing cooling air and the stator having winding end turns extending from each end. An air deflector is coupled to one end of the rotor and has a generally curved configuration for directing cooling air exiting the air passages into a generally radial flow direction and onto the stator end windings. The stator end windings comprise turns of a plurality of electrical conductors forming the stator windings circuits which are wound to form a plurality of phase windings. Accordingly, the prior art has not disclosed a retrofittable baffle assembly which can be used to improve the efficiency of force ventilated AC motors.

BRIEF SUMMARY OF THE INVENTION

The present invention provides a segmented stator end turn air deflector for a force ventilated AC motor which can be retrofitted into existing motors for redirecting air flowing through passages in a stator of the motor. In an exemplary form, a segmented stator end turn air deflector comprises a plurality of generally flat plates each having a trapezoidal shape with arcuate inner and outer edges for positioning within a cylindrical motor housing. Each plate has a single hole to enable the plate to be bolted to an existing bracket within the motor housing. The hole positions are such that the plates can be oriented perpendicular to the direction of air flow through the motor stator whereby air exiting the stator passages impinges on the plates and is directed radially inward of the motor and onto end turns of the motor coils or windings.

BRIEF DESCRIPTION OF THE DRAWINGS

For a better understanding of the invention, reference may be made to the following detailed description taken together with the accompanying drawings in which.

DETAILED DESCRIPTION OF THE INVENTION

Figure 1:
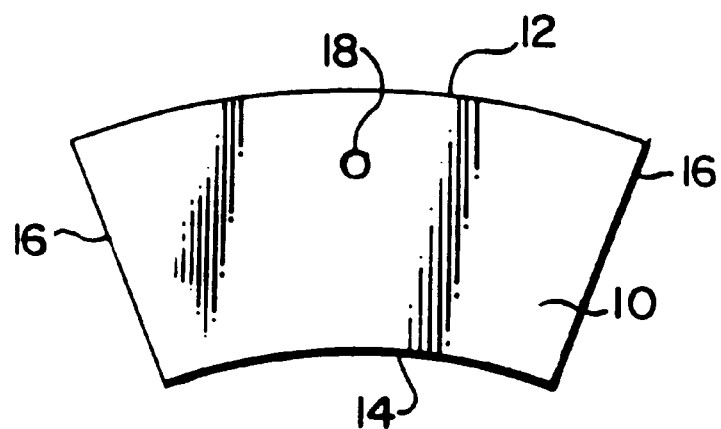
FIG. 1 is a plane view of a segment of an air deflector in one form of the present invention.

FIG. 1 is a plane view of one segment 10 of a segmented air deflector in one form of the present invention. In one embodiment, each air deflector segment 10 is a flat piece of fiberglass, with a predetermined thickness sufficient to meet the structural requirements of the system. For example, the thickness may be between about 1/16 inch and 1/4 inch depending on the motor size and air flow. The segments are shaped so that the top and bottom edges 12 and 14, respectively, of the segment are concentrically curved with a predetermined radius of curvature dependent upon the radius of the associated motor. The side edges 16 of the segment converge radially inwardly at a predetermined angle so that the segment has a generally trapezoidal shape. A hole 18 is located near the top edge 12 of the segment, centered between the side edges 16.

Figure 2:
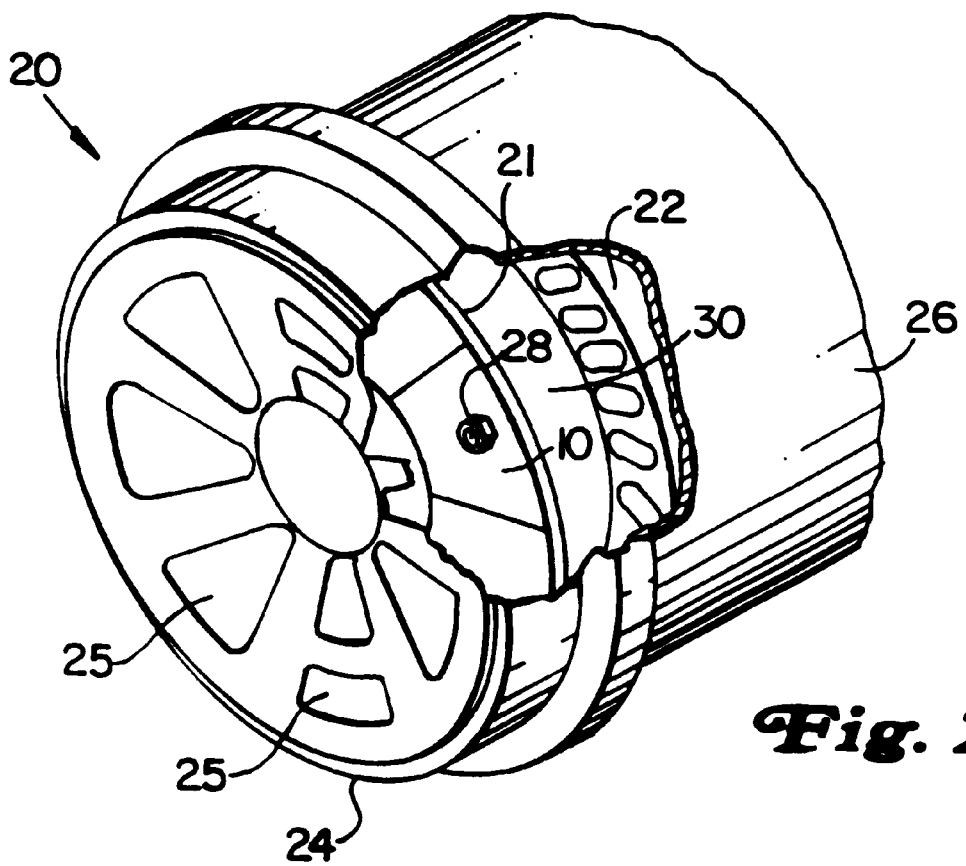
FIG. 2 is a front perspective view of a motor incorporating the segment air deflector with a partial cutaway view to show mounting of the segment.
Figure 3:
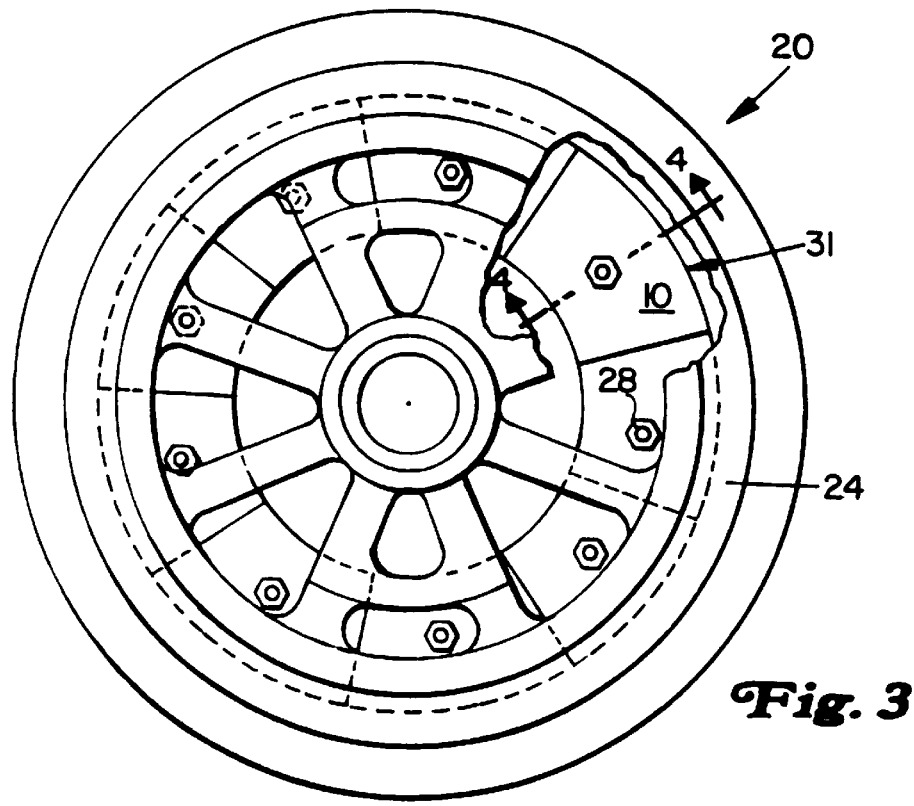
FIG. 3 is a front elevation view of the motor of FIG. 2.

FIG. 2 is a front perspective view of a motor with parts removed to illustrate the placement of a segment of the air deflector within an AC motor 20 and FIG. 3 is a front elevation view of the same motor. The motor 20 includes a stator 22, a motor end bell 24 and an outer housing 26. The end bell 24 is formed with a plurality of ventilation openings 25 through which cooling air passes. A portion of the motor end bell is cut away so that the air deflector segment 10 and a bolt 28 connecting the air deflector segment to a connection ring support 30 are also visible. The bolt 28 fits within the hole 18 located on the air deflector segment 10. The end view of FIG. 3 shows multiple segments 10 positioned to form a segmented deflector 31 of an air baffle assembly in accordance with preferred embodiments of the present invention.

Figure 4:
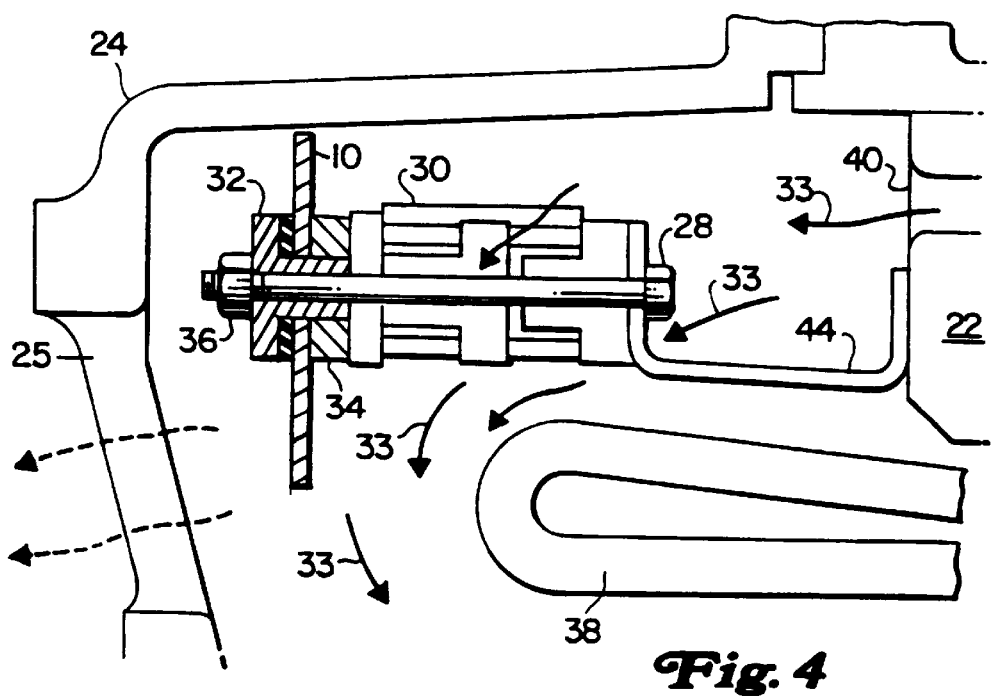
FIG. 4 is an enlarged cross sectional view of FIG. 3 taken along lines 4—4, illustrating one method of mounting of a segment.

FIG. 4 is an enlarged cross sectional view of FIG. 3 taken along lines 4—4, illustrating one of the connection ring supports 30 and air flow (arrows 33). The embodiment of FIG. 4 shows how the bolt 28 extends through an air deflector segment 10. In one embodiment, as illustrated, washers 32, 34 are placed over bolt 28 and into hole 18 to assist in holding the air deflector segment 10 in place. A nut 36 screws onto the bolt 28 holding the bolt 28, washers 32 and 34, and air deflector segment 10 in place. The air deflector is positioned so that it does not make contact with the motor end bell 24 or any of the stator winding end turns 38. With the air deflector segments 10 firmly in place, air flows from air passages 40 formed within the stator 22 at the air exit end 42. When the air reaches the air deflector segments 10, the air is directed radially inward towards the stator winding end turns 38 as opposed to simply flowing directly out of the air outlets 25 in the end bell 24. The air forced toward and into the end turns 38 is believed to provide cooling which can improve the efficiency of the motor. The connection ring support 30 is attached to stator 22 by a bracket 44.

To install the air deflector, the air deflector segments 10 can be installed through the air ventilation openings 25 in the end bell 24. Preferably, with consideration of motor size, the openings 25 provide sufficient access space to allow removal and replacement of nuts 36 without removing the end bell from the motor. It will be noted that suitable washers 32, 34 may be provided for mounting of the segments 10.

Accordingly, an existing motor may be modified to incorporate improved cooling without disassembly of the motor by providing a plurality of segments 10, each of which is sized to be installed through existing air outlet openings 25 in the motor end bell 24. Backfit modification of a motor is further facilitated by forming the segments 10 to be secured to an existing structure within the motor, such as for example, connection ring supports 30 using existing hardware such as bolt 28. Preferably, the segments 10 are sized to form a continuous ring around the end of the stator 22, or alternatively, to cover as much of the end as possible while still being sized to pass through openings 25 and to be supported by existing structures within the motor.

While the invention has been described in what is presently considered to be preferred embodiments, many variations and modifications will become apparent to those skilled in the art. Accordingly, it is intended that the invention not be limited to the specific illustrative embodiments but be interpreted within the full spirit and scope of the appended claims.

What is claimed is:

1. An electric motor having improved ventilation for improved cooling comprising a stator having winding end turns at each end thereof, air passages extending generally longitudinally along the longitudinal axis of the motor and positioned generally radially outwardly of the winding end turns, an outer housing around the stator, an end bell at one end of the motor having a plurality of ventilation openings therein at spaced locations around the end bell and a generally annular disc shaped air deflector positioned in the motor longitudially between the winding end turns and the end bell and extending generally radially outwardly from adjacent the winding end turns toward the outer housing, with the deflector comprising a plurality of generally planar segments mounted within the motor in generally side-by-side relation and together redirecting the air exiting the air passages to flow generally radially inwardly past the winding end turns, with each deflector segment being sized to fit through a ventilation opening to enable a motor built without a deflector to be modified to include said deflector without disassembly of the motor.

2. The electric motor of claim 1 wherein each deflector segment is of generally the same shape and size.

3. The electric motor of claim 1 wherein each ventilation opening is of generally the same shape and size.

4. The electric motor of claim 1 wherein the inner diameter of the deflector is greater than the radial inner surface of the winding end turns and less than the radial outer surface of the turns.

5. The electric motor of claims 4 wherein the inner diameter of the deflector is generally midway between the radial inner and outer surfaces of the winding end turns.

6. The electric motor of claim 1 wherein the outer diameter of the deflector is positioned generally adjacent the outer housing.

7. The electric motor of claims 1 wherein each segment is of generally trapezoidal configuration with arcuate shaped inner and outer edges.

8. The electric motor of claim 1 further comprising a fastener for securing each deflector segment to the motor.

* * * * *